(12) United States Patent
Stegemann et al.

(10) Patent No.: US 10,377,296 B2
(45) Date of Patent: Aug. 13, 2019

(54) ILLUMINATED TRIM FITTING

(71) Applicant: Dura Automotive Body And Glass Systems, GmbH, Plettenberg (DE)

(72) Inventors: Jan Stegemann, Neuenrade (DE); Torsten Hundt, Neuenrade (DE); Stephan Röhner, Dortmund (DE)

(73) Assignee: DURA AUTOMOTIVE HOLDINGS U.K. LTD., Birmingham (GB)

( * ) Notice: Subject to any disclaimer, the term of this patent is extended or adjusted under 35 U.S.C. 154(b) by 294 days.

(21) Appl. No.: 15/303,114

(22) PCT Filed: Mar. 20, 2015

(86) PCT No.: PCT/EP2015/055990
§ 371 (c)(1),
(2) Date: Oct. 10, 2016

(87) PCT Pub. No.: WO2015/154972
PCT Pub. Date: Oct. 15, 2015

(65) Prior Publication Data
US 2017/0036590 A1 Feb. 9, 2017

(30) Foreign Application Priority Data
Apr. 8, 2014 (EP) .................................. 14163945

(51) Int. Cl.
*B60Q 1/26* (2006.01)
*B60Q 1/00* (2006.01)
(Continued)

(52) U.S. Cl.
CPC .......... *B60Q 1/0017* (2013.01); *B60J 10/265* (2016.02); *B60J 10/75* (2016.02); *B60Q 1/268* (2013.01);
(Continued)

(58) Field of Classification Search
CPC ........... B60J 10/70; B60J 10/75; B60Q 1/268; B60Q 1/323
See application file for complete search history.

(56) References Cited

U.S. PATENT DOCUMENTS

| | | | |
|---|---|---|---|
| 2002/0002294 A1 | 1/2002 | D'Amato et al. | |
| 2009/0134661 A1* | 5/2009 | Sugiura | B60J 5/0411 296/146.9 |
| 2014/0049977 A1 | 2/2014 | Gold | |

FOREIGN PATENT DOCUMENTS

| | | |
|---|---|---|
| DE | 20110352 U1 | 9/2001 |
| DE | 102006049872 A1 | 10/2007 |

(Continued)

*Primary Examiner* — Andrew J Coughlin
(74) *Attorney, Agent, or Firm* — Robert E. Ford; Raymond J. Vivacqua; Steven L. Crane

(57) ABSTRACT

An illuminated trim fitting for a motor vehicle, in particular a trim fitting as a cover fitting of a sealing strip for the window channel of a vehicle door, is intended to provide a high-quality illuminating effect accompanied at the same time by a simple structural design, low manufacturing costs and space-saving attachment. In addition, the trim fitting is to differ as little as possible externally from non-illuminated trim fittings. For this purpose there is provision that a light gap is formed between a profiled strip of the trim fitting and the adjacent vehicle outer skin, through which light gap the light emitted by a lighting structure provided on the rear of the trim fitting can exit to the outside.

32 Claims, 2 Drawing Sheets

(51) Int. Cl.

| | | |
|---|---|---|
| *B60Q 1/32* | (2006.01) | |
| *B60R 13/04* | (2006.01) | |
| *B60J 10/265* | (2016.01) | |
| *B60J 10/75* | (2016.01) | |
| *F21V 7/22* | (2018.01) | |
| *F21S 45/50* | (2018.01) | |

(52) U.S. Cl.
CPC ............ *B60Q 1/2696* (2013.01); *B60Q 1/323* (2013.01); *B60R 13/04* (2013.01); *F21S 45/50* (2018.01); *F21V 7/22* (2013.01)

(56) References Cited

FOREIGN PATENT DOCUMENTS

| | | |
|---|---|---|
| DE | 102008027128 A1 | 3/2009 |
| DE | 202009002108 U1 | 4/2009 |
| DE | 102011106318 A1 | 1/2013 |
| DE | 102012017281 A1 | 3/2013 |
| EP | 1101655 A2 | 5/2001 |
| EP | 1772667 A2 | 4/2007 |
| EP | 2063057 A1 | 5/2009 |
| EP | 2363324 A1 | 9/2011 |
| EP | 2556996 A2 | 2/2013 |
| JP | 2001347898 A | 12/2001 |

\* cited by examiner

ILLUMINATED TRIM FITTING

CROSS-REFERENCE TO RELATED APPLICATIONS

This application claims priority to PCT application PCT/EP2015/055990 filed on Mar. 20, 2015, which claims priority to EP Application No. 14163945 filed on Apr. 8, 2014 and is herein incorporated by reference.

FIELD OF THE INVENTION

The invention relates to an illuminated trim fitting for a motor vehicle, in particular a trim fitting as a cover fitting of a sealing strip for the window channel of a vehicle door, and to a trim fitting arrangement on a vehicle, and to a motor vehicle having such a trim fitting arrangement, wherein the trim fitting has at least one lighting means and a profiled strip which, given correct final mounting on the vehicle, defines a decorative side which is directed away from the vehicle and which has an externally visible decorative surface of the profiled strip, and a functional side which is directed towards the vehicle and is not visible externally, wherein the at least one lighting means is arranged on sides of the functional side after correct final mounting, in order to backlight at least part of the profiled strip given correct final mounting on the vehicle.

BACKGROUND OF THE INVENTION

It is known to provide trim fittings for motor vehicles with lighting means in order to give the vehicle a more high-quality appearance.

German laid-open patent application DE 10 2008 027 128 A1 discloses a cover fitting or sealing strip for a motor vehicle having a profiled strip into which an LED for illuminating a trim element arranged on the outer surface or a cover layer provided on the outer surface is embedded. However, the structure is comparatively complex and costly to manufacture and furthermore does not permit any continuously uniform illumination over the entire length of the fitting because of the LEDs which are provided only at discrete positions. Furthermore, it is considered disadvantageous that the cover fitting or sealing strip can be identified from the outside as an illuminated fitting owing to its external design.

DE 10 2006 049 872 A1 discloses a trim fitting having an illumination module which is let into the trim fitting as a separate component. The illumination module permits only a restricted illumination range, and the design of the trim fitting is complex as a result of the need for fitting a cut out into the trim strip. An additional factor here is also that this type of design of a trim fitting compromises the high-quality visual effect because the visible surface of the trim fitting is penetrated.

A likewise multi-component trim fitting of complex design with integrated lighting means is also disclosed by document EP 2 063 057 A1.

EP 1 772 667 A2 discloses a plastic component with an integrated light source. In this context, the light elements are embedded at least partially in the plastic moulded mass of a visible part, which considerably complicates the manufacture of the plastic component. Furthermore, the trim fitting has to be fabricated from plastics which can be through-lit, which can give a less high-quality impression compared to other materials.

The last-mentioned disadvantage of the restricted material selection also relates to the illuminated trim fittings which are disclosed in documents EP 2 556 996 A2 and EP 2 363 324 A1.

A fitting having a through-lit, transparent fitting part is also disclosed by US 2003/0002294 A1. In order to prevent the lighting means from being visible from the outside, said lighting means emits light laterally into the transparent fitting part and is covered by an additional cover which can be seen from the outside. This design is relatively complex and requires additional components and does not permit any fittings which are very flat and narrow in design. Document DE 201 10 352 U1 describes a completely comparable and therefore also similarly disadvantageous design.

An object of the invention is therefore to make available a trim fitting of the type specified at the beginning and a motor vehicle having a trim fitting which is of structurally simple design and can be manufactured cost-effectively. The trim fitting may be flat in design and be capable of being mounted in a space-saving fashion, but nevertheless be able to give a visually high-quality impression compared to the known trim fittings which are provided with lighting structures, and said trim fitting should differ externally as little as possible, or even not at all, from non-illuminated trim fittings. In addition, the trim fitting may permit the use of non-transparent materials.

This object may be achieved according to the invention in that the trim fitting is designed in such a way that, given correct final mounting on the vehicle, a light gap is formed between the trim fitting and the adjacent vehicle outer surface, in particular between the profiled strip and the adjacent vehicle outer surface, through which light gap the light emitted by the lighting structure is capable of exiting to the outside in a visible fashion.

With this configuration, it becomes superfluous to embed lighting structures in the profiled strip, and the need to use materials which can be through-lit (transparent or translucent) is eliminated. Instead, high-quality metal strips, which cannot be through-lit, can also be used, which metal strips effectively visually conceal assembly components which are located on the functional side of the profiled strip, in particular the lighting structure or cabling. A light guide, an LED or some other component which increases the material homogeneity of the profiled strip is not necessary. The profiled strip is also not penetrated by a component in a way which is visible from the outside.

SUMMARY OF THE INVENTION

The light beams are generated on the side of the profiled strip facing away from the decorative side (on the functional side), back-light the trim fitting, in particular the profiled strip, and exit towards the outside from the rear through the gap present between the adjacent vehicle outer surface and the trim fitting. This generates indirect illumination through the trim fitting, which illumination can extend uniformly over the length of the trim fitting given an appropriate arrangement of the lighting structure. In the final-mounted state, the trim fitting cannot be differentiated externally from other, non-backlit trim fittings. Only a small shadow gap, which serves as a light gap when the lighting structure is switched on, may be perceptible, the width of which shadow gap can, given skillful dimensioning, be kept so small that it is visually insignificant.

The vehicle outer surface is the external surface of the vehicle which is adjacent to the trim fitting in the region of the light gap and which bounds the light gap together with the trim fitting. This can be, in particular, the coated surface of the outer skin of the vehicle bodywork which adjoins the profiled strip, that is to say in particular the coated sheet metal of the vehicle bodywork. If other parts, for example a sealing strip onto which the trim fitting is fitted, project between the trim fitting and the sheet metal of the vehicle bodywork, the vehicle outer surface can also be formed by the surface of these parts.

The lighting structure is arranged on the side of the profiled strip facing away from the decorative side (on the functional side), but is located outside the profiled strip cross section which is determined by the profiled strip, and is therefore in particular not embedded in the profiled strip cross section. It can be provided that the lighting structure is arranged on the external surface of the profiled strip on the functional side of the profiled strip. However, it can alternatively also be provided that the sealing strip which is arranged on the motor vehicle bears the lighting structure or said lighting structure is attached to the vehicle outer surface, on the functional side of the trim fitting.

The lighting structure may be formed by a luminescent film, in particular an OLED film (organic light emitting diode), wherein a PHOLED (phosphorescent OLED) is also considered to be covered by the term OLED. An OLED is appropriate because it is of extremely flat design, requires only a very small installation space and can be printed or bonded onto virtually any material. During their manufacture, OLEDs provide a significant cost saving over LCD technology, in particular because the OLEDs can be easily processed and are simple to actuate. Compared to LEDs, OLEDs generate less heat and have a larger temperature range. The low operating voltage which is required for OLEDs is also advantageous. Furthermore, the use of OLEDs ensures that in the illuminated state the trim fitting does not experience any critical heating caused by the illumination. However, use is not necessarily restricted to OLEDs as a lighting structure. In particular, other film-like lighting structure, for example an electroluminescent film (LM film) are also possible as further lighting structure. The lighting structure can be configured, in particular, as a lighting strip which extends along the trim fitting. The thickness of such a luminescent film or of such a luminescent film strip may be less than a millimeter, in particular approximately 0.2 mm to 0.3 mm.

The profiled strip is preferably composed of a single homogenous material. The material can be not only metals which are usually used for trim fittings, such as aluminium or (stainless) steel, but also, in particular, thermal plastics, for example PMMA, SAN, PC or ABS.

In one aspect, the profiled strip cross section has a main limb whose outwardly directed surface forms the externally visible decorative surface. Protruding from this main limb are preferably one or more functional limbs with which the profiled strip interacts with a sealing strip which bears the latter. In particular it can be provided that the functional limbs engage in the sealing strip in order to be held thereon.

The lighting structure may be arranged on the functional limb which is at the bottom given correct installation and which, in one aspect, extends inwards towards the sealing strip from a bend in the course of the material which forms the lower visible edge of the main limb and encloses an acute angle, after correct final mounting on the vehicle. That surface of this functional limb located on the functional side of the profiled strip which is directed towards the vehicle outer surface bears the lighting structure in one embodiment. However, it can also be provided that the lighting structure is arranged on the rear of the main limb. In both cases, the light gap can be defined by the distance between the bottom visible edge of the main limb forming the decorative surface and the adjacent vehicle outer surface.

In order to keep the width of the light gap constant over the entire strip length of the typically thin-walled, and therefore per se flexible, profiled strip, a spacer element which is arranged between the profiled strip and the vehicle outer surface can be provided, on which spacer element the profiled strip is at least indirectly supported. As a result, the light gap width can be defined, and there is no risk of the light gap width varying over the length of the strip owing to fabrication inaccuracies or other material distortion. Such a spacer element can be formed, in particular, by a limb of the sealing strip which rests directly on the vehicle outer skin and on which the profiled strip is arranged. However, a spacer element which is separate from the sealing strip can also be provided, on which spacer element, in particular, the functional limb, bearing the lighting structure, of the profiled strip cross section is supported directly or indirectly via the lighting structure. This spacer element can also be fabricated from a transparent material, with the result that, in particular, when the lighting structure itself is supported on this spacer element, the emitted light is directed through the spacer element to the light gap.

BRIEF DESCRIPTION OF THE DRAWINGS

Further features and advantages of the invention can be found in the claims and the following description of preferred exemplary embodiments with reference to the drawings, in which:

DETAILED DESCRIPTION OF THE PREFERRED EMBODIMENTS

Figure 1:
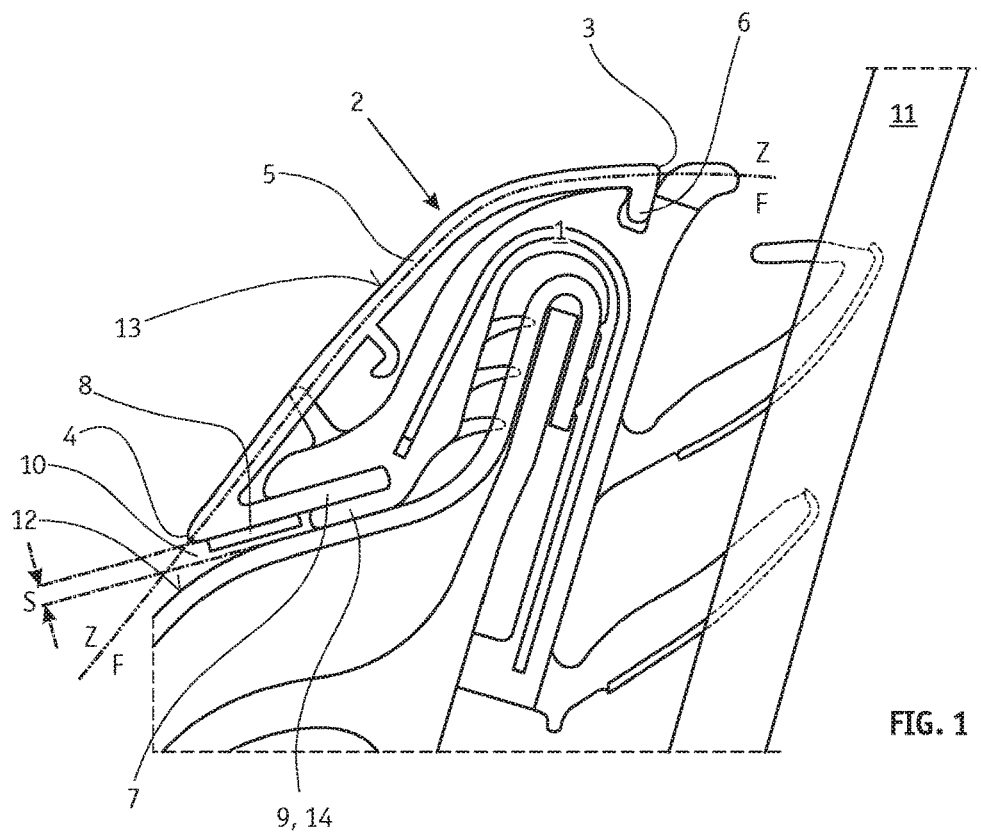
FIG. 1 is a partial sectional view which shows a trim fitting attached to a sealing strip including a spacer element.

FIG. 1 illustrates a profiled strip 2, in the form of a window channel covering fitting, which is attached to a sealing strip 1. A further use would be, for example, a shoulder line trip strip or a cover strip for covering, for example, the A strip, B strip or C strip. The sealing strip 1 is fitted with its U-shaped section, reinforced by an inserted metal bar, onto a vehicle bodywork part of a motor vehicle and seals off the door well from the window pane 11. The profiled strip 2 is configured to cover this sealing strip 1 and to conceal it as a decorative part in a way which gives the most high-quality visual impression possible. For this purpose, the profiled strip 2 or the profiled strip cross section formed by the material of the profiled strip 2 has an arcuate main limb 5, the outwardly pointing surface of which forms the decorative surface 13 of the profiled strip 2 which is externally visible given correct mounting. The decorative surface 13 is bounded by an upper visible edge 3 and a lower visible edge 4. In the region of these visible edges 3, 4, the main limb 5 bends inward and forms an upper functional limb 6 and a lower functional limb 7. The functional limbs 6, 7 provide engagement of the profiled strip 2 in the sealing strip 1 in order to be held thereon. The dot-dashed line running along the main limb 5 in the figures is intended to illustrate the boundary between the decorative side Z and the functional side F.

The trim fitting has a lighting structure 8 in addition to the preferably materially homogenous profiled strip 2. The lighting structure 8 is formed by an OLED film which is printed directly onto the surface of the lower functional limb 7 facing the vehicle outer surface 12, or is connected to said surface of the lower functional limb 7 in some other way, for example by bonding. The lower functional limb 7 therefore serves as a carrier for the lighting structure 8.

The profiled strip 2 is preferably manufactured from a non-translucent material, with the result that assembly components lying on the functional side F (in the figures those which are essentially to the right of the main limb 5), that is to say in particular the sealing strip 1 and the lighting structure 8, cannot be seen from the outside through the profiled strip or are effectively covered by the profiled strip 2.

It is apparent that a gap with a gap width S, which can be perceived as a shadow gap when the lighting structure 8 is not active or is switched on, remains between the surface of the lower functional limb 7 which is directed towards the vehicle outer surface 13, and the vehicle outer surface, or between the lower visible edge 4 and the vehicle outer surface 13. However, after the lighting structure 8 has been activated or switched on it directly illuminates the vehicle outer surface and a large part of the emitted light passes through the gap, acting now as a light gap 10, towards the outside. As a result, indirect illumination is produced which has a high-quality appearance and is emitted mainly downwards, effectively preventing persons from being dazzled when they get in or out of the vehicle.

In FIG. 1 it is also apparent that the lower functional limb 7 of the profiled strip 2 and therefore also the lighting structure 8 which is arranged thereon are held at a defined distance from the vehicle outer surface by means of a sealing strip limb 9 which bears directly on the vehicle outer surface. Said sealing strip limb 9 therefore forms a spacer element 14 which ensures that the functional limb which bears the lighting structure 8 is uniformly spaced apart from the vehicle outer surface, thereby ensuring a constant light gap width over the length of the profiled strip. The light gap width S is preferably in the range between 1 mm and 4 mm, particularly preferably between 2 mm and 3 mm. Depending on the light yield of the respectively used structure and according to the luminosity of the lighting structure 8, light gap widths S below 1 mm are also possible.

Figure 2:
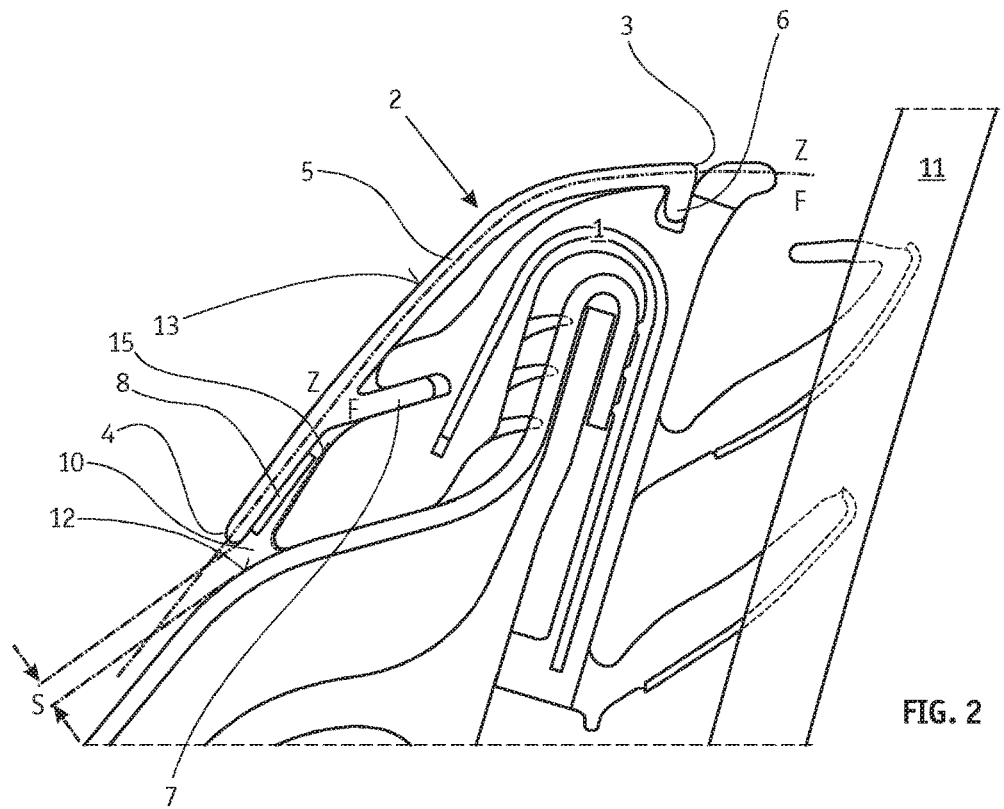
FIG. 2 is a partial sectional view which shows a trim fitting attached to a sealing strip, including a lighting structure attached to a main limb and a reflective surface on the sealing strip.

The profiled strip 2 shown in FIG. 2 differs from the profiled strip shown in FIG. 1 essentially in the different shape of the profiled strip cross section and the arrangement of the lighting structure 8. The lighting structure 8 is attached directly to the rear of the main limb 5 that is to say on the rear surface of the main limb 5, facing towards the vehicle. The lower functional limb 7 which interacts with the sealing strip 1 sits above the lighting structure 8 on the rear of the main limb 5.

In the embodiment of the profiled strip 2 which is shown in FIG. 2, there is no spacer element 14, which would prevent the distance of the lighting structure 8 from the directly adjoining component, here the sealing strip 1, from being kept constant. Instead, the distance of the lighting structure 8 from the sealing strip 1 would vary here when the profile of the two components is not parallel, which can result in different intensities of the illumination of the light gap 10, in particular if the lighting structure 8 enters into contact with the adjacent sealing strip 1 and as a result a large part of the emitted light does not reach the light gap 10. However, as a result of the steep, predominantly vertical orientation of the lighting structure 8, a relatively small amount of inward pivoting of the main limb 5 towards the sealing strip 1 is not as significant for the light gap width S as would be the case with the embodiment shown in FIG. 1 in which the lighting structure 8 is more horizontally oriented.

In addition, in FIG. 2 a reflective coating is provided on the surface region of the sealing strip 1 facing the lighting structure 8. This reflective coating can be formed by an applied reflective film or a coating which is vapour-coated or sputtered on, for example. The reflective surface 15 which is produced as a result increases the light yield in that the light emitted by the lighting structure 8, which is predominantly incident on this reflective surface, is more effectively diverted towards the light gap 10, and the light yield, that is to say the proportion of the total light output which actually exits the light gap 10, is increased overall. The reflective surface 15 can be oriented towards the lighting structure 8 in such a way that it forms a deflection surface with which the light beams are deflected in the direction of the light gap 10 in a targeted fashion as by a mirror.

Although the reflective coating is shown explicitly only in FIG. 2, the use in other embodiments is also conceivable in so far as they have a surface, in particular on the sealing strip 1 or on the vehicle outer surface 12, which can serve as a reflective surface in the fashion described above.

Finally, FIG. 3 shows again an embodiment which is approximated to FIG. 1 and in which, however, the spacer element 14 is not formed by the material of the sealing strip 1 but rather by a component which is separate from the sealing strip 1 and is attached in FIG. 3, for example, to the vehicle outer surface 12. However, as an alternative to this, it can also be provided that the spacer element 14 is attached to the sealing strip 1 or the lighting structure 8.

In order to ensure sufficient illumination of the light gap 10, the spacer element 14 is formed by a translucent spacer strip, in particular made of a translucent plastic, which can pass on the emitted light in the direction of the light gap. Surface regions of the spacer element 14 can be provided with a reflective coating. This relates, of course, in particular to those surface regions which face away from the light gap 10. As a result it is possible to prevent light from exiting the spacer element 14 at a surface facing away from the light gap 10 and being lost in terms of illuminating the light gap 10, or at least to reduce this. Overall, the light yield (the proportion of the light emitting by the lighting structure 8 which actually exits the light gap 10) can be improved or a lighting means with a relatively low power can be used with a comparable light yield.

Figure 3:
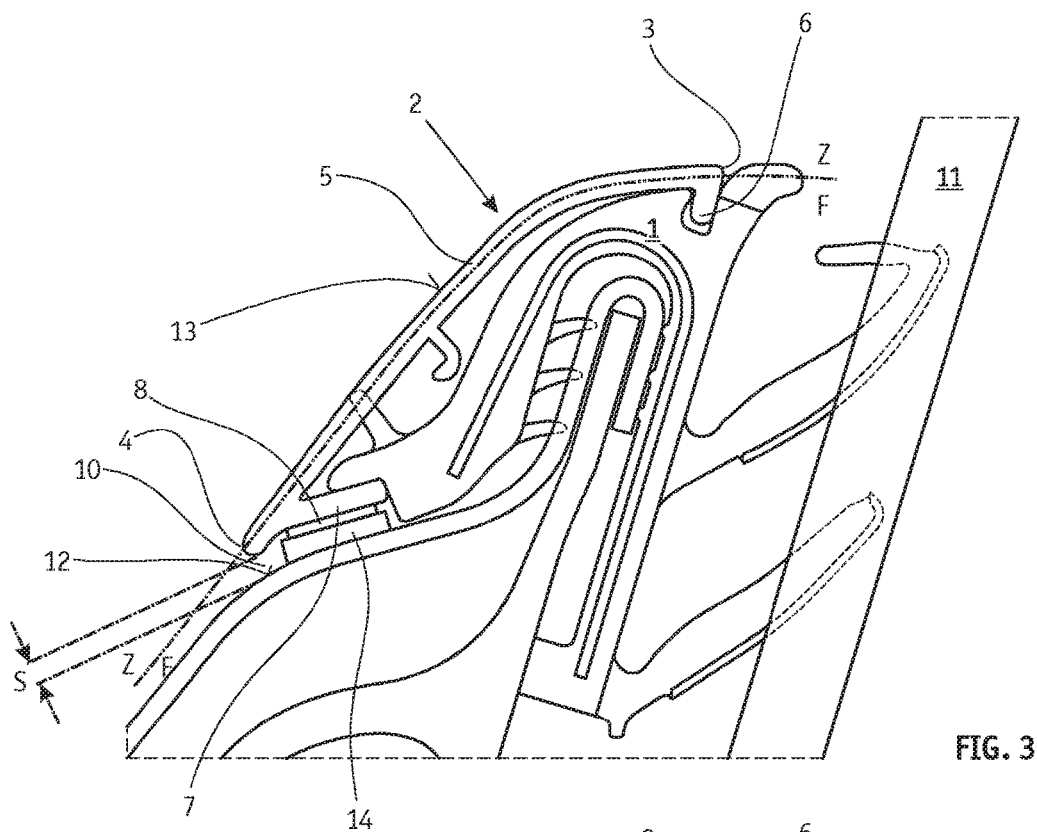
FIG. 3 is a partial sectional view which shows a trim fitting attached to a sealing strip, including a separate spacer element.

The spacer element 14 which is shown in FIG. 1 and FIG. 3 also has the function of preventing the ingress of dirt and moisture into the space located on the functional side F of the profiled strip 2.

Figure 4:
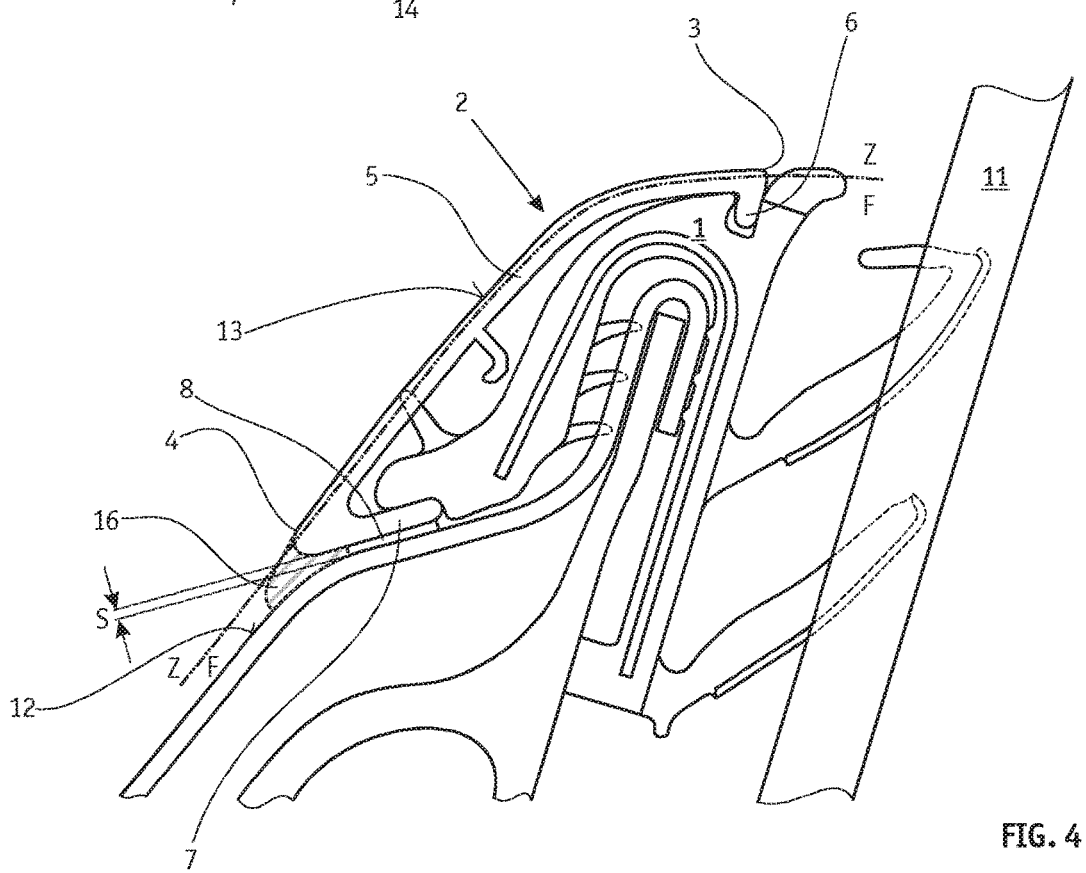
FIG. 4 is a partial sectional view which shows a trim fitting, attached to a sealing strip, including a lighting structure in contact with an outer surface of a vehicle.

Finally, FIG. 4 shows an embodiment which is based on FIG. 1 and FIG. 3 and in which the lighting structure 8 is in direct contact with the vehicle outer surface 12, and the light emitted by the lighting structure 8, for illuminating the light gap 10, exits the narrow side of the lighting structure 8 facing the light gap 10.

Optionally, a translucent closure strip 16 is provided on the lower visible edge of the profiled strip 2 as an optional additional feature which can also be used for other embodiments such as the embodiments shown in the preceding figures. Said closure strip 16 is located between the profiled strip 2 and the vehicle outer surface 12 and closes off the light gap 10 against the ingress of dirt and moisture. As illustrated in FIG. 4, the outwardly directed surface of the closure strip 16 advantageously terminates flush with the external surface of the profiled strip 2. In one particular embodiment, the translucent closure strip 16 can also be embodied as part of the profiled strip 2 or injection-moulded thereon or connected to the profiled strip 2 in some other way.

The lighting structure 8 does not necessarily have to be a film strip which extends over the entire trim fitting. Depending on the application, the lighting structure 8 can also extend over just part of the length of the trim fitting or it is possible to provide a plurality of lighting structures 8, preferably a plurality of lighting structures 8 which directly adjoin one another and which form regions which can be actuated selectively, for example in order to present only certain selected information or in order to illuminate regions which can be delimited selectively from one another separately.

A further advantage of the described invention in general and of the embodiments shown in the figures is that the backlit trim fittings, as well as compatible, non-backlit trim fittings, can optionally be fitted onto the same carrier profile or sealing strip 1. The sealing function and optics or lighting function of the assembly are completely separate from one another, with the result that only the trim fitting assumes the optical function. The sealing strip 1 does not have to be specifically prepared for the use of a backlit trim fitting or specially selected for this purpose.

For the vehicle manufacturer there is the possibility of giving the vehicle a significantly more high-quality appearance solely through the selection of the trim fitting which is to be fitted onto the same sealing strip 1 for all the vehicle equipment level configurations, for example within the scope of a light assembly which is offered as a special accessory. In this way it is also possible for vehicles which originally have a non-backlit trim fitting to be easily retrofitted in a way which is particularly simple in terms of manual labour, without the need to replace the sealing strip 1.

LIST OF REFERENCE SYMBOLS

1 Sealing strip
2 Profiled strip
3 Upper visible edge
4 Lower visible edge
5 Main limb
6 Upper functional limb
7 Lower functional limb
8 Lighting structure
9 Sealing strip limb
10 Light gap
11 Window pane
12 Vehicle outer surface
13 Decorative surface
14 Spacer element
15 Reflective surface
16 Closure strip
S Light gap width
Z Decorative side
F Functional side

The invention claimed is:

1. An illuminated trim fitting for a vehicle, the illuminated trim fitting comprising:
   a profiled strip mounted on the vehicle and defining a front side which is facing away from the vehicle and a rear side which is facing towards the vehicle, the profiled strip having a main limb, the main limb having an outwardly pointing decorative surface with an edge that partially defines a gap, wherein the edge is defined as a lower end of the outwardly pointing decorative surface of the main limb; and
   a lighting structure disposed on the rear side and back-lighting at least part of the profiled strip, wherein light emitted by the lighting structure passes through the gap to an outside of the illuminated trim fitting in a visible fashion.

2. The illuminated trim fitting of claim 1 wherein the lighting structure is attached to the main limb.

3. The illuminated trim fitting of claim 1 wherein the main limb includes a lower limb.

4. The illuminated trim fitting of claim 3 wherein the lower limb engages a sealing strip.

5. The illuminated trim fitting of claim 3 wherein the lower limb is spaced apart from the lighting structure.

6. The illuminated trim fitting of claim 3 wherein the lower limb is spaced above the lighting structure.

7. The illuminated trim fitting of claim 3 wherein the lighting structure is connected to the lower limb.

8. The illuminated trim fitting of claim 3 wherein the lighting structure is in contact with the lower limb.

9. The illuminated trim fitting of claim 3 wherein the lower limb is a carrier for the lighting structure.

10. The illuminated trim fitting of claim 3 wherein the lower limb is positioned at a defined distance from a vehicle outer surface by a sealing strip limb.

11. The illuminated trim fitting of claim 3 wherein the lighting structure is positioned at a defined distance from a vehicle outer surface by a sealing strip limb.

12. The illuminated trim fitting of claim 1 further comprising a spacer element configured to ensure that the main limb is uniformly spaced apart from a vehicle outer surface.

13. The illuminated trim fitting of claim 12 wherein the lighting structure is positioned between the spacer element and the profiled strip.

14. The illuminated trim fitting of claim 12 wherein the main limb includes a lower limb that engages a sealing strip, and the spacer element is separate from the sealing strip.

15. The illuminated trim fitting of claim 12 wherein the main limb includes a lower limb that engages a sealing strip, and the spacer element is not formed by the material of the sealing strip.

16. The illuminated trim fitting of claim 12 wherein the spacer element is attached to the lighting structure.

17. The illuminated trim fitting of claim 12 wherein the spacer element prevents ingress of dirt and moisture into a space located on the functional side of the profiled strip.

18. The illuminated trim fitting of claim 1 wherein the gap is in the range between 1 mm and 4 mm.

19. The illuminated trim fitting of claim 1 wherein the edge is straight.

20. The illuminated trim fitting of claim 1 wherein the gap is partially defined by the edge and partially defined by the vehicle.

21. An illuminated trim fitting for a vehicle, the trim fitting comprising:
   a profiled strip mounted on the vehicle and defining a decorative side which is facing away from the vehicle and a functional side which is facing towards the vehicle, the profiled strip having a main limb having an outwardly pointing decorative surface with a lower visible edge that partially defines a gap, wherein the lower visible edge is defined as a lower end of the outwardly pointing decorative surface of the main limb, the lower visible edge extended along a portion of a length of the profiled strip, the main limb having a lower limb; and a lighting structure contacting the lower limb and backlighting at least part of the profiled strip, and wherein light emitted by the lighting structure passes through the gap to an outside of the illuminated trim fitting in a visible fashion.

22. The illuminated trim fitting of claim 21 wherein the lower limb extends from the functional side of the main limb.

23. The illuminated trim fitting of claim 21 wherein the lower limb is formed as an integral part of the main limb.

24. The illuminated trim fitting of claim 21 wherein the main limb includes an upper limb separate and spaced apart from the lower limb.

25. The illuminated trim fitting of claim 21 wherein the lower limb engages a sealing strip.

26. The illuminated trim fitting of claim 21 wherein the lower limb is a carrier for the lighting structure.

27. The illuminated trim fitting of claim 21 further comprising a spacer element configured to ensure that the main limb is uniformly spaced apart from an outer surface of the vehicle.

28. The illuminated trim fitting of claim 27 wherein the lighting structure is positioned between the spacer element and the profiled strip.

29. The illuminated trim fitting of claim 27 wherein the lower limb engages a sealing strip, and the spacer element is separate from the sealing strip.

30. The illuminated trim fitting of claim 29 wherein the spacer element is not formed by the material of the sealing strip.

31. The illuminated trim fitting of claim 27 wherein the spacer element is attached to the lighting structure.

32. The illuminated trim fitting of claim 27 wherein the spacer element prevents ingress of dirt and moisture into a space located on the functional side of the profiled strip.

* * * * *